J. H. HILLMAN.
Improvement in Ore-Cleaners and Separators.
No. 132,577. Patented Oct. 29, 1872.
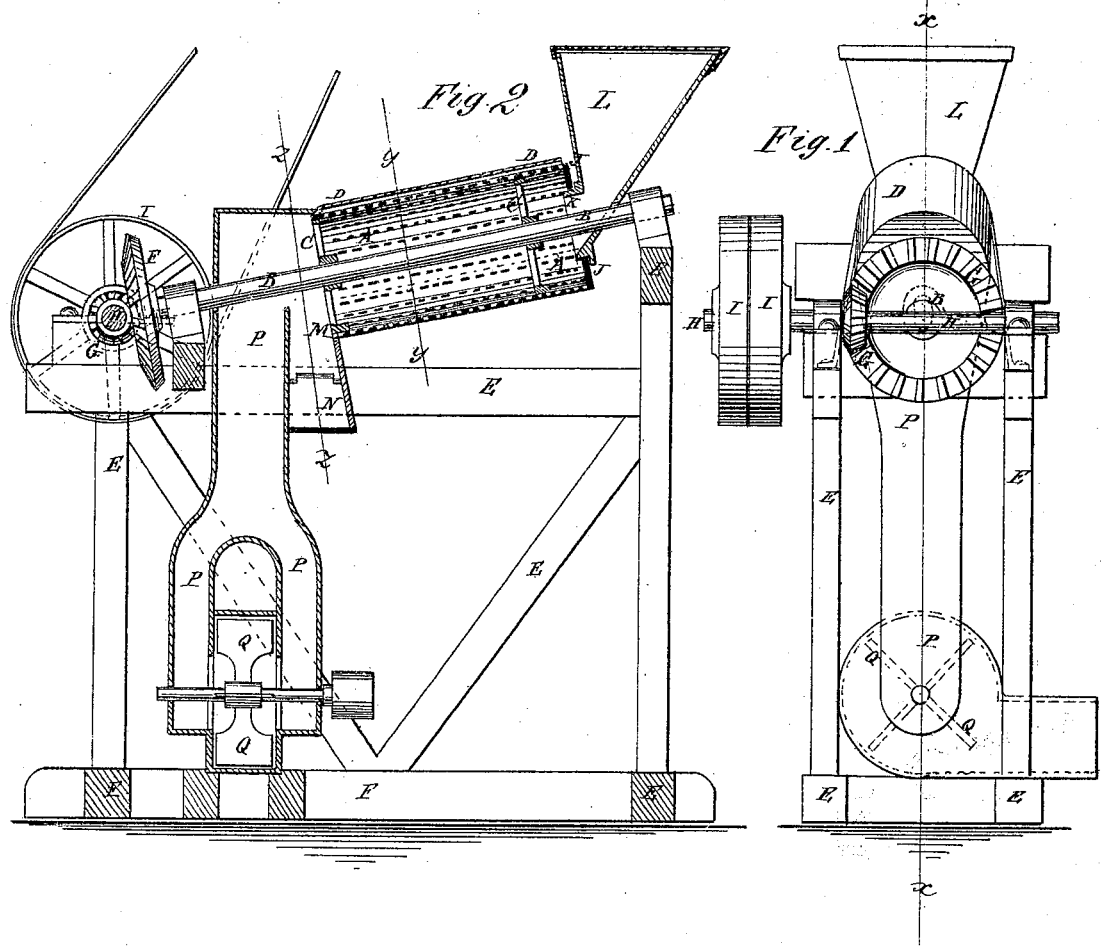
Witnesses:
A. W. Almqvist
W. O. Graham
Inventor:
John Hart Hillman
per Munn & Co
Attorneys.

UNITED STATES PATENT OFFICE.

JOHN H. HILLMAN, OF TRIGG FURNACE, KENTUCKY.

IMPROVEMENT IN ORE CLEANERS AND SEPARATORS.

Specification forming part of Letters Patent No. 132,577, dated October 29, 1872.

*To all whom it may concern:*

Be it known that I, JOHN HART HILLMAN, of Trigg Furnace, in the county of Trigg and State of Kentucky, have invented a new and useful Improvement in Pneumatic Ore-Cleaner, of which the following is a specification:

In the accompanying drawing, Figure 1 is a rear-end view of my improved ore-cleaner; Fig. 2 is a detail vertical longitudinal section of the same taken through the line $x\ x$, Fig. 1; Fig. 3 is a detail cross-section of the revolving cylinder taken through the line $y\ y$, Fig. 2; and Fig. 4 is a detail cross-section of the discharge-chamber taken through the line $z\ z$, Fig. 2.

Similar letters of reference indicate corresponding parts.

My invention has for its object to furnish an improved machine for separating or cleaning ore by a current or blast of air, and which shall be simple in construction, convenient in use, and effective in operation; and it consists in the construction and combination of the various parts of the machine, as hereinafter more fully described.

A is a cylinder made of boiler-plate, and which is rigidly connected with the shaft B by the arms or spiders C, so as to be carried around by and with said shaft in its revolution. The upper part of the cylinder A is covered for about two-thirds of its circumference with a jacket, D, which is connected with and supported from the frame E of the machine. The journals of the shaft B revolve in bearings in the frame E, and to its rear end is attached a bevel-gear wheel, F, the teeth of which mesh into the teeth of a bevel-gear wheel, G, attached to the shaft H, which revolves in bearings in the rear part of the frame E, and to which are attached the fast and loose pulleys I, which receive the belt by which the machine is driven. The cylinder A is inclined, and has an inwardly-projecting flange, J, formed around its upper end, as shown in Fig. 2, forming a circular opening in the middle part of the said upper end, into which fits the circular-projection K at the bottom of the feed-hopper L. The upper arms or spider C are placed at a little distance from the upper end of the cylinder A, as shown in Fig. 2, to allow the ore to feed freely from the hopper L into the cylinder A. The lower spider C is placed at the extreme lower end of the cylinder A, as shown in Fig. 2. M is the box that receives the ore, and which is made to fit closely against the lower end of the cylinder A, so as to receive the ore from said cylinder. The lower part of the receiving-box M is provided with two doors, N, which are bent inward or toward each other, and are kept closed by weights O, as shown in Fig. 4. From the upper part of the ore-receiver M a pipe or pipes, P, lead to the fan-blower Q, by which a current of air is exhausted through the cylinder A. The fan-blower Q is constructed in the ordinary manner, and is driven by a belt from the power that rotates the cylinder A. The shell of the cylinder A is perforated with numerous holes, as shown in Fig. 2, so that when the fan Q is operated, a strong current of air may enter through the small holes in the cylinder A, pass through the said cylinder A, through the ore-receiver M, through the pipes P, through the fan Q, and may be discharged into any desired place. The ore after being crushed to the desired fineness is delivered into the hopper L by any suitable means, and is fed into the cylinder A. The cylinder A, by its motion, keeps the ore rolling and sliding about, the inclination of the cylinder A and its own gravity causing it to pass down to the lower end of said cylinder. This movement of the ore rubs off the dirt and dust, which is carried out through the cylinder, pipes, and fan by and with the current of air. The smaller particles of ore will pass through the holes of the cylinder A, while the larger particles will be carried down to the ore-receiving box M. When the ore has sufficiently accumulated in the box M to overbalance the weights O, it will force the doors N open and be discharged into any suitable receptacle provided for that purpose, and the doors N will be again closed by the weights O. The jacket D is made to fit the cylinder A at its ends, as shown in Fig. 2, and at its side edges, as shown in Fig. 3, to prevent a current of air from passing in through the holes in the upper part of the said cylinder, thus making the current of air strong in the lower part of the cylinder where the small particles of ore must pass through. The small holes in the cylinder A and the jacket D may be dispensed with by making the opening at the bottom of the hopper L large, and forming strips or shelves upon the inner surface of the cylinder A and extending its whole length. In this case the ore would be continually carried up by the shelves or flanges and dropped through the cylinder, until it had reached the lower end of said cylinder, the falling ore being all the time exposed to a current of air which would carry off all the lighter material. The fan-blower may be placed at the upper end of the cylinder A by introducing the ore near the top of the opening and connecting the pipe P with the lower part of said opening. In this case the lower end of the cylinder A may be left open. If desired, a blast may be used instead of an exhaust, when circumstances will allow. The main object in using an exhaust-blast is to prevent the dust taken from the ore from flying about. This the exhaust entirely prevents, and the discharge may be into a large chamber where the current would be small, and where the dust would settle by its own weight and could be taken away at intervals, as might be convenient. If the air be exhausted at the upper end of the cylinder A it may be necessary to feed the ore into said cylinder by means of a rotary feeder, so constructed as to allow only a small quantity of air to pass in with the ore, so as not to affect the draft-current passing up through the said cylinder. In this case the air in its passage to the fan would be compelled to pass up through the cylinder and through the falling ore, meeting the ore as it progressed along the cylinder, the pure air thus coming first in contact with the ore that was already nearly clean.

Having thus described my invention, I claim as new and desire to secure by Letters Patent—

1. The combination of the ore-receiver M, provided with weighted doors N O, with the cylinder A and hopper L, whether said cylinder be perforated or not, and whether the jacket D be used or not, substantially as herein shown and described, and for the purpose set forth.

2. The combination of a fan-blower Q and air-pipe or pipes P with the cylinder A, hopper L, and ore-receiver M, whether the said cylinder A be perforated and the jacket D be used or not, substantially as herein shown and described, and for the purpose set forth.

JOHN HART HILLMAN.

Witnesses:
T. L. WASHINGTON.
THOS. B. WILSON.